Nov. 11, 1969 M. E. HENES 3,477,640
DIVISION TERMINATING MECHANISM
Filed Oct. 12, 1967 6 Sheets-Sheet 3

INVENTOR
MARTIN E. HENES
BY *Stephen E. Feldman*
ATTORNEY

Nov. 11, 1969   M. E. HENES   3,477,640
DIVISION TERMINATING MECHANISM
Filed Oct. 12, 1967   6 Sheets-Sheet 5

INVENTOR
MARTIN E. HENES
BY Stephen E. Feldman
ATTORNEY

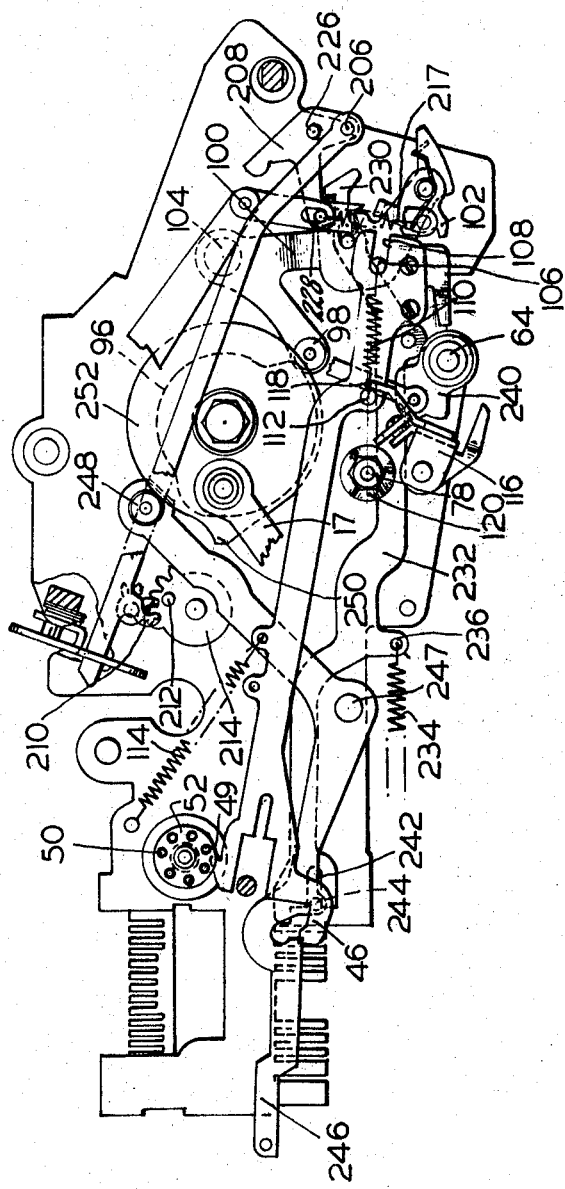

United States Patent Office 3,477,640
Patented Nov. 11, 1969

3,477,640
DIVISION TERMINATING MECHANISM
Martin E. Henes, Denville, N.J., assignor to Litton Business Systems, Inc., Orange, N.Y., a corporation of New York
Filed Oct. 12, 1967, Ser. No. 675,134
Int. Cl. G06c 23/06
U.S. Cl. 235—63             14 Claims

ABSTRACT OF THE DISCLOSURE

A device which operates in conjunction with a division mechanism in a calculating machine to cause the dividing part of the overall division process to terminate after a preset number of orders have been divided. This operates before normal termination of the division process to thereby limit the number of digits in the quotient. An external settable dial is provided which can be set to a number which is related to the desired number of orders which are to be divided before termination, or which can be set to a position whereby the termination mechanism is disabled and the division process continues to its normal termination.

BACKGROUND OF THE INVENTION

It is most desirable in division mechanisms to be able to terminate the dividing part of the division process before it has gone to its normal conclusion. The reason is that division mechanisms in most calculating machines are relatively slow and often all that is needed by the operator is the first few digits of the quotient and not the entire quotient taken out to many digits. Therefore, if the division process is terminated at a predesignated point before its normal termination, a more useful answer would result.

In prior are mechanisms, this was done with tabulating stops; stops which were placed at predesignated points along the division mechanism. When the division mechanism encountered one of these tabulating stops, the division process would be concluded.

The mechanism, while working well had the particular disadvantage that the division process had to begin in the exact same spot each time or otherwise too few quotient digits might result. The mechanism stops after a preset distance is passed through without any relationship to the numbers being divided.

On the other hand, since applicant's device is directly related to the numbers being divided, it counts the number of shifts between the orders which are being divided, it is of no consequence where it is started since it begins counting only from the point at which it was started. Moreover, applicant's mechanism provides the operator with a readily available means, a settable dial, for varying the predetermined number of shifts between orders through which the division process will pass before it is terminated, or for disabling this terminating mechanism if so desired.

SUMMARY OF THE INVENTION

An external dial is provided which is settable to control the number of orders through which the division mechanism will operate before the dividing part of the process terminates and the remaining parts of the division process begin.

The mechanism that counts the quotient actuates a bail as it moves from order to order along the quotient register to cause actuation of a terminating and restoring mechanism when it reaches the number of moves set on the dial. The division mechanism is then stopped from dividing in any more orders and is restored to its home position so that the remaining parts of the division process, the totaling out and printing of the quotient and remainder, can take place.

BRIEF DESCRIPTION OF THE DRAWINGS

FIG. 7 is a view of the right side of the calculator of FIG. 3 showing part of the division terminating mechanism of this invention.

FIG. 8 is an exploded view of the settable dial of FIG. 5.

DESCRIPTION OF THE PREFERRED EMBODIMENT

Figure 1:
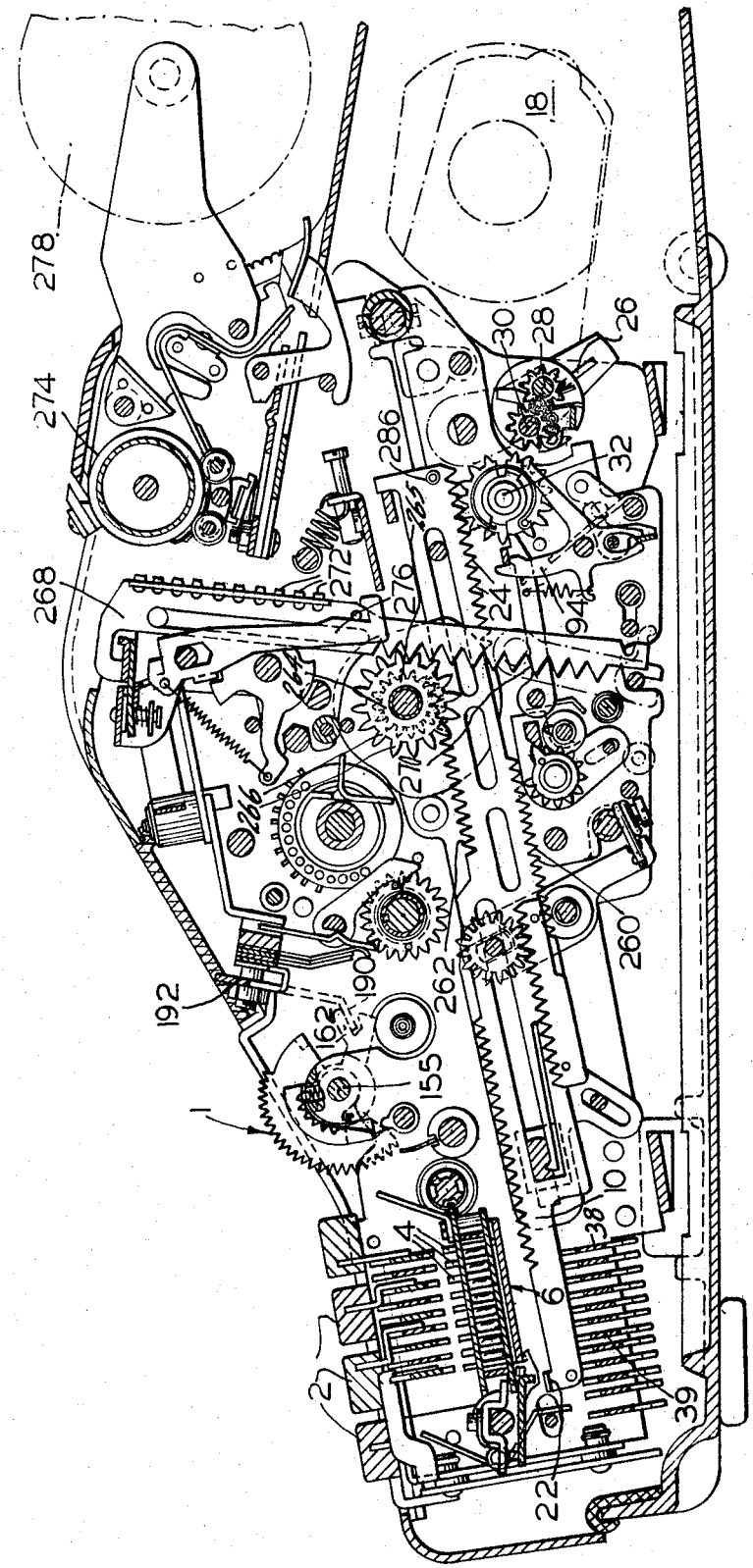
FIG. 1 is a cross sectional view of a calculator employing the division terminating mechanism of the present invention.

In FIG. 1 is shown a typical calculator with a division mechanism employing the terminating mechanism of the present invention. The construction and operation is as follows: The settable dial 1 shown in FIG. 1 is set to a number position or to the division symbol. The number positions are related to the number of orders of the quotient register which are to be counted before termination (as will be described hereinafter), and the division symbol indicates that the division process is to go to completion without any prior termination.

The dividend is then entered into the pin carriage by depressing the numeral keys 2 to cause pins 4 in the pin carriage 6 to be lowered as the pin carriage is indexed from lower to higher orders of the calculator.

Figure 2:
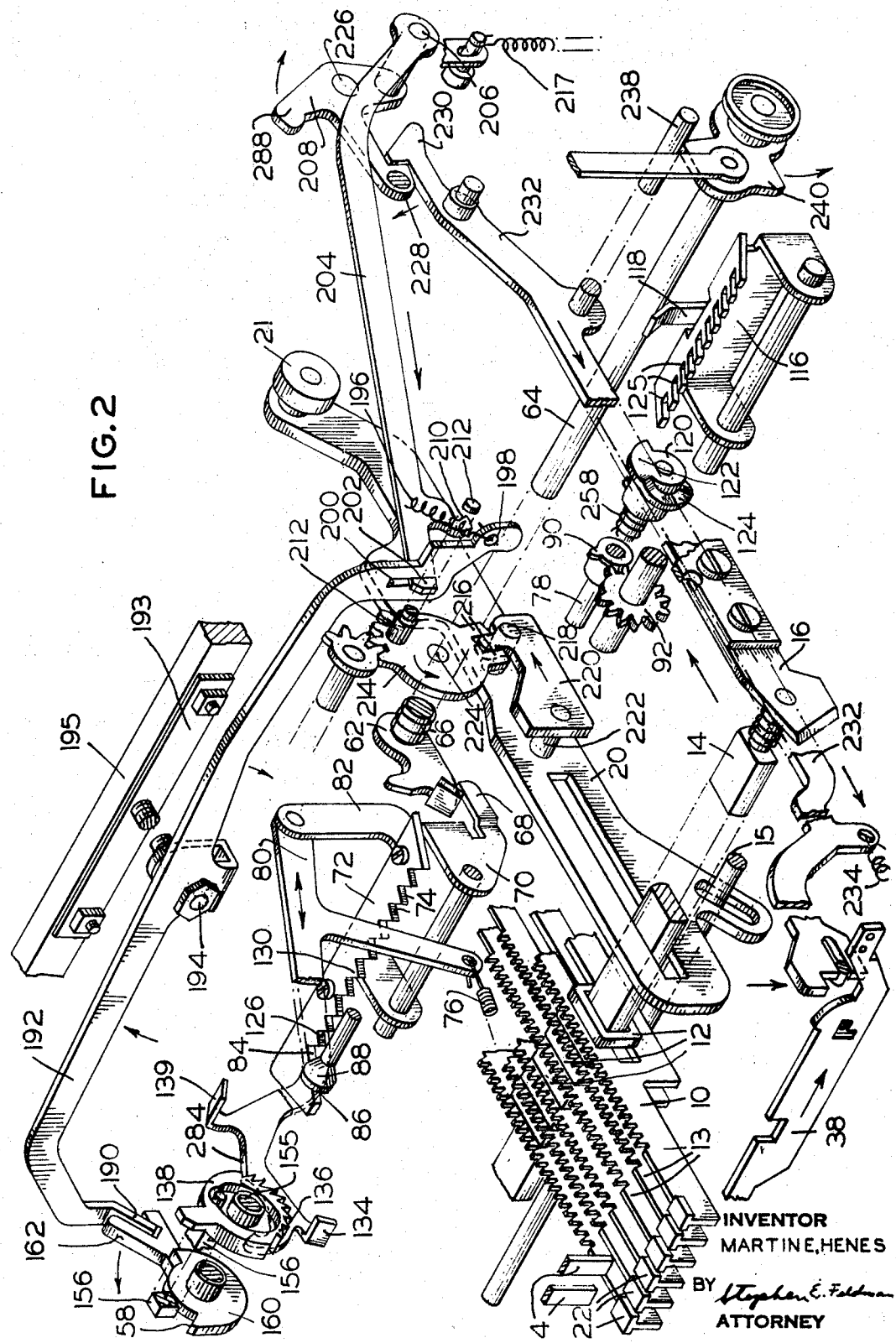
FIG. 2 is a perspective view of part of the calculator of FIG. 1 showing the division terminating mechanism of the present invention.

The dividend entry key 8 (FIG. 3) is now depressed to cause the pin carriage to move to the highest order of the calculator in which a dividend can be entered and then to cause the racks 10 (FIG. 1) to be driven in a rearward direction, to the right in FIG. 2. The racks are driven by means of driving member 16, which is connected to the racks by bar 14 and frictional connectors 12. These connectors pass through openings 11 in the racks to frictionally connect the racks to the driving member. The driving member 16 is connected to the motor 18 by means of end 17 of the member being connected to cam 252 which is connected to the motor. As member 16 is driven rearwardly, bar 14 causes connectors 12 which frictionally hold the racks to move the racks rearwardly. The front ends 13 of the racks are also simultaneously raised by means of member 20. Bar 14 fits through an opening in this member, as does another bar 15. The opening that bar 15 fits into is slanted so that as member 20 is driven through roller 21, bar 15 fitting in the slanted opening will cause member 20 to raise the front ends of the racks, so that projections 22 on the front ends will be in the path of the depressed pins 4 of pin carriage 6. Each rack therefore will only travel until its projection 22 contacts a depressed pin. In the case of a nine, where there is no depressed pin, the rack will travel its full length and in the case of a zero also where there is no depressed pin, the rack will not travel at all. The racks thereby travel a distance determined by the value in each order of the pin carriage.

At the rear, the racks are each meshed by means of a set of teeth 24 on the bottom thereof through an intermediate register 32 with a flip-over accumulator register 26 having add gears 28 and subtract gears 30. As the racks move to the rear, the dividend is entered into the add gears 28 of the flip-over register. It will be appreciated that as shown in FIG. 1 the flip-over register is not in mesh with intermediate register 32, but the mechanism is synchronized so that as the racks move rearwardly, the flip-over register is brought into mesh therewith.

Figure 3:
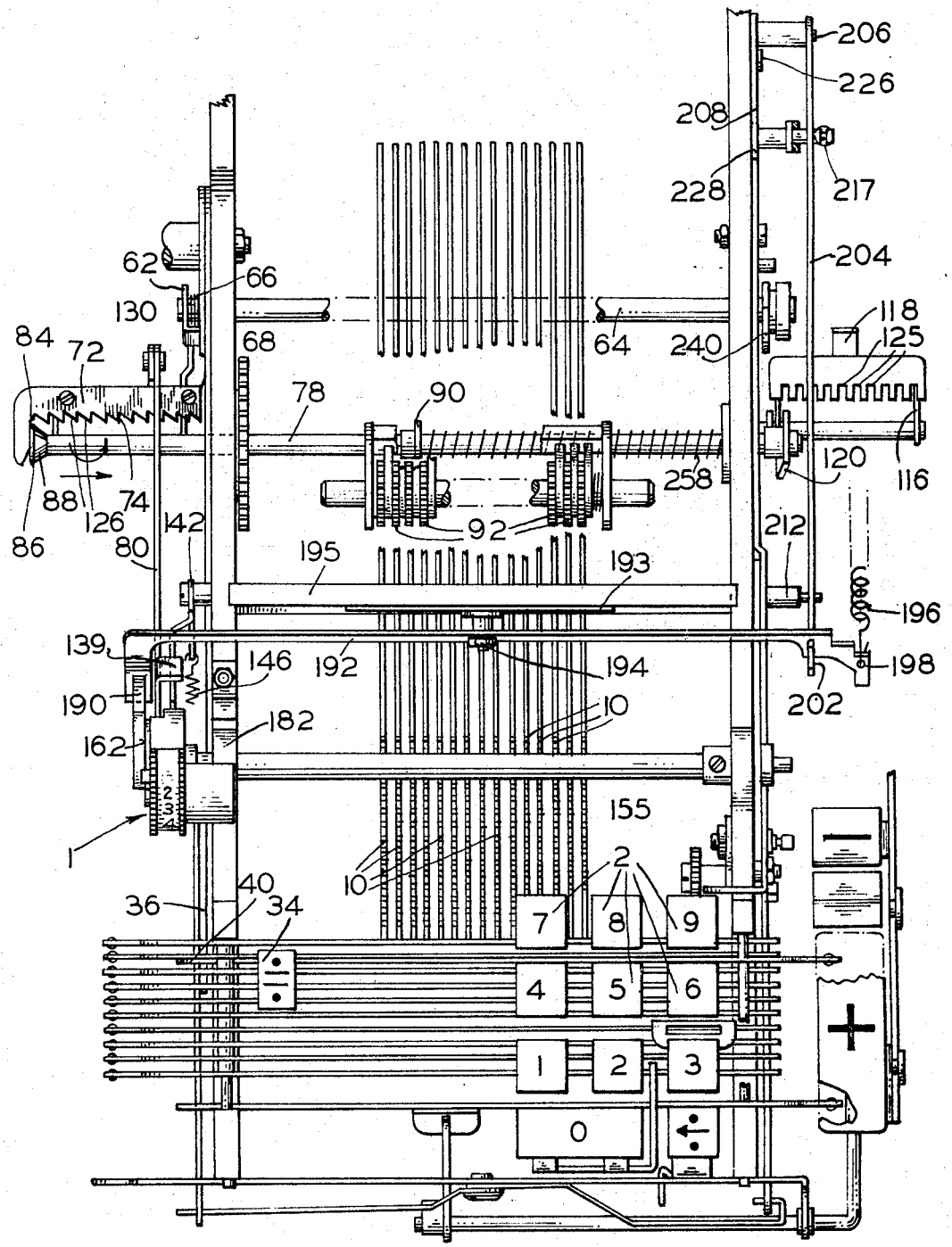
FIG. 3 is a plan view of part of the calculator of FIG. 1 showing part of the division terminating mechanism.

In a like manner, after the dividend is entered into the flip-over register, the register is shifted out of mesh with the intermediate register 32 and the racks are then driven in a return stroke back to their normal position by the friction drive mechanism aforementioned; the pin carriage is also simultaneously returned to its home position (to the right in FIG. 3).

The machine is now in condition for entry of the divisor. The numeral keys are depressed to enter the divisor into pin carriage 6 as it is indexed across the machine. The division key 34 is then depressed to begin the division process.

The depression of the division key moves the division shaft latch 36 and the division program cross slide 38 and also causes a blocking arm (not shown) to be positioned. The latter is positioned to prevent depression of the numeral keys during the division operation.

Figure 4:
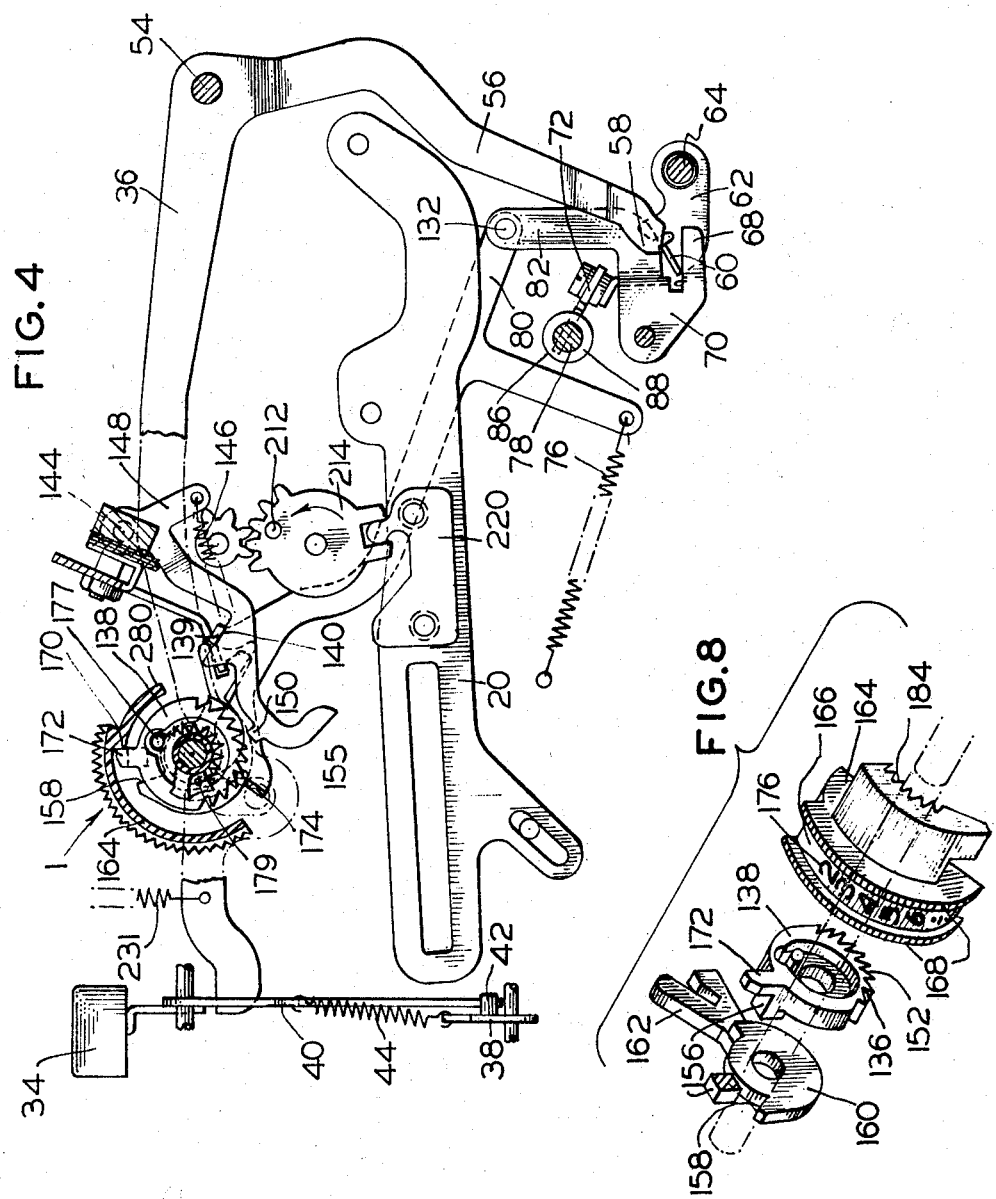
FIG. 4 is a view of part of the left side of the calculator of FIG. 3 showing part of the division terminating mechanism.

The division program slide 38 is caused to move to the right in FIG. 4 by link 40, which is part of the division key 34, abutting against pin 42. Spring 44 connected between link 40 and slide 38 assists in the movement of slide 38. It also biases the link 40 to its home position after operation. The movement of the division program slide causes the functioning of the mechanisms needed for the dividing part of the division process and prevents depression of any other function keys and operation of other function control mechanisms other than those needed for the dividing part of the division process. The program slide also pushes up hook 46 of the division shift link 48 (FIG. 7) causing it to be raised so that it is in position for hook 49 on the upper end thereof to engage a pin 50 of pin wheel 52. Pin wheel 52 is connected to an indexing means for moving the pin carriage from order to order during the division process.

As aforementioned, the division shaft latch 36 is caused to function due to depression of the division key. The shaft latch pivots in a counterclockwise direction about pivot point 54 to cause its lower arm 56 and especially the tip 58 thereof to be disengaged from tab 60 of arm 62 to release the arm and thereby to release the division shaft 64 to which the arm is connected. A spring 66 between arm 62 and the side frame of the machine causes the arm and thereby division shaft 64 to be shifted to the left in FIG. 2. The spring 66 will also pivot the division shaft in a clockwise direction (FIG. 2) to cause arm 62 to reengage tip 58 of arm 56 by contacting the undersurface of tab 60 to thereby hold latch 36 in the counterclockwise position until the division shaft is restored near the end of the division operation, as will be subsequently described.

Pivoting of arm 62 also releases hook end 68 of arm 70 of aligning bail 72 causing the bail, which has a saw toothed edge 74, to be rocked by spring 76 in a counterclockwise direction (FIG. 2) to move it into operative relation with counting finger shaft 78. As bail 72 moves into operative relation with shaft 78, it cams the shaft slightly to the left due to beveled edge 84 of the shaft. This slight movement of the counting finger shaft to the right (FIG. 2) causes counting finger 90 (FIG. 2) fastened on the counting finger shaft to be aligned with the highest order quotient gear of the quotient register 92.

Figure 6:
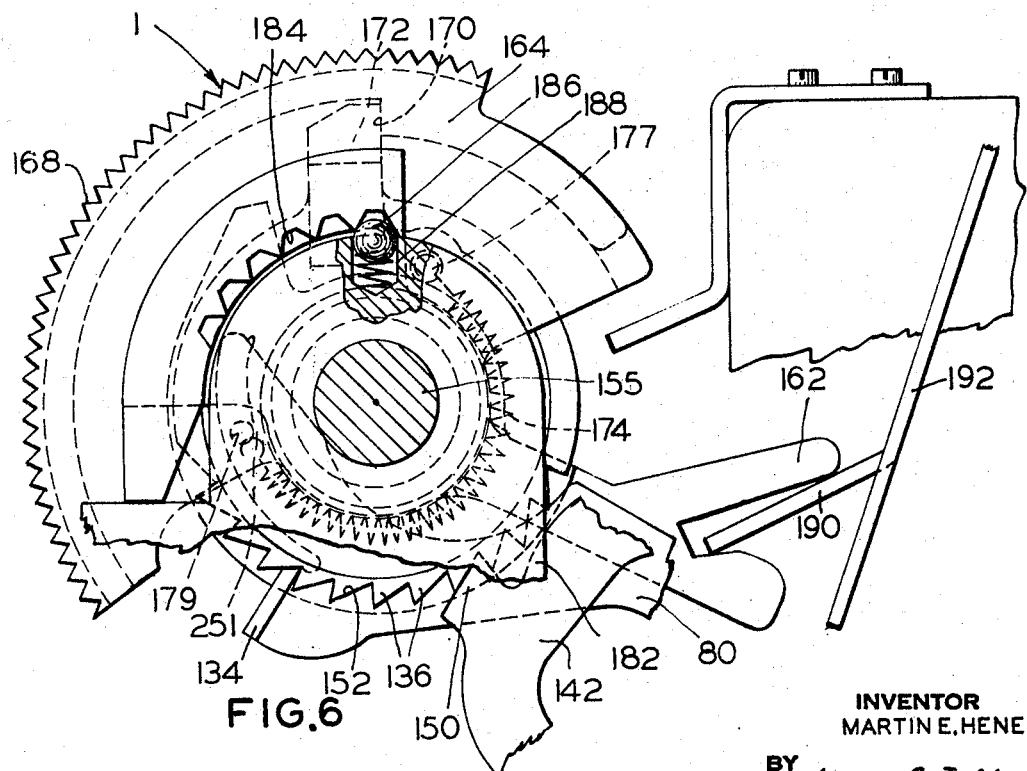
FIG. 6 is a side view with parts broken away of the settable dial of FIG. 5.

The movement of aligning bail 70 also will cause link 82 which is connected thereto to move to the left in FIG. 4 and thereby cause link 80, to which the aforementioned spring 76 is connected to move to the left in FIG. 4. In moving to the left, tab 134 of link 80 will engage teeth 136 of member 138 as shown in FIG. 6 and as will be subsequently described.

The dividing operation then begins. The racks reciprocate, moving to the rear of the machine and then moving forward so as to add the divisor to the subtract gears 30 of the flip-over register during the rearward stroke. As each cycle of the racks is completed, the quotient counting finger 90 completes a cycle in the clockwise direction, so that its single tooth meshes with the next to the highest order quotient gear, to advance the gear one tooth space in a counterclockwise direction. Reciprocation of the racks will continue until an overdraft signal of the flip-over register occurs. This happens when the divisor is greater than the amount left in the flip-over register (the remaining part of the dividend). The tens transfer register associated with the flip-over register will then carry from zero to nine in the highest order register gear, and thereby trip the highest order carry latch 94. The tripping of the carry latch causes the flip-over register to flip to its positive side so that the add gears 28 are now in position to be in mesh with intermediate register 32 and thereby the racks 10 for adding the divisor to the dividend in a corrective cycle. In each order when an overdraft occurs, a corrective cycle will be performed in that order and as will be subsequently described, the division mechanism will be shifted to the next lower order to repeat the same process of first subtracting and then adding.

Before the overdraft occurred, cam follower 98 (FIG. 7) of arm 100 had attempted to follow the surface of cam 96, which rotates in the clockwise direction, but was unable to do so because bail 102, attached to arm 100, was blocked from moving in a clockwise direction and thereby permitting follower 98 to follow the surface of the cam. When the overdraft occurred, as aforementioned, the block was removed from bail 102 and follower 98 was thereby permitted to follow the surface of cam 96. By following the surface of the cam, follower 98 and thereby arm 100 will be rocked in a clockwise direction about pivot point 104 to cause division shift link 48 to move forward (to the left in FIG. 7) because of a connection between the arm and the link under the biasing action of spring 114. Arm 100 and link 48 are connected by means of pin 106 on the arm and slot 108 in the link, and kept in engagement by spring 110. The spring is connected between pin 106 on arm 100 and pin 112 on link 48.

As the division shift link 48 is caused to move forward, hook 49 of the link engages a pin 50 of pin wheel 52 so that when the link is moved to the rear, wheel 52 which moves the pin carriage, will be rotated a step counterclockwise to thereby index the pin carriage to the next lower order. The link will be moved rearwardly (to the right in FIG. 7) under the influence of spring 110 when follower 98 and thereby arm 100 is rocked counterclockwise as the follower runs along the surface of cam 96.

When link 48 is shifted forward, shift pawl 116 is released. The shift pawl which shifts the quotient counting finger shaft is normally held in the clockwise position because its arm 118 contacts pin 112 on link 48. When it is released, the pawl moves counterclockwise into engagement with shifting cam 120 on the right end of the quotient counting finger shaft (FIG. 2). The surface 122 of the cam will mesh with the leftmost of the slots 125 in the shift pawl and as the counting finger shaft and thereby cam 120 continue to rotate in a clockwise direction, surface 124 of the cam will be brought into slot 125. The transition between the planes of the cam surfaces will cause the counting finger shaft and thereby counting finger to shift a distance equal to the distance between the planes 122 and 124 of the cam. This distance is equal to the distance between orders of the quotient register and therefore it will cause counting finger shaft 78 to shift one order to the right along the quotient register. This brings the counting finger into alignment with the next adjacent lower order gear of the quotient register. The racks will now begin dividing in this order in the same manner as with the previous order. After completion in this order, the counting finger will shift to the next lower order and so forth until the division process is terminated by the terminating mechanism of this invention or by going to its normal completion.

To prevent the counting finger from moving more than one order, pawl 116 is removed from engagement with cam 120 after the machine has cycled once. This is done by pin 112 on link 48 engaging arm 118 of pawl 116 as the link is returning to the right in FIG. 7 to rotate the link in a clockwise direction, and thereby remove it from engagement with cam 120.

Due to the rightward movement of the counting finger shaft in shifting from order to order, as aforementioned, the conical left end 88 of counting finger shaft 78 will cam against an edge 126 of a tooth of aligning bail 72 to cause the bail to rock in a clockwse direction (FIG. 2) and then to snap back counterclockwise under the bias of spring 76. It will snap back when the end 86 of the counting finger shaft is in the next groove of the grooves between the teeth 130 of the aligning bail. The shaft will be held in the groove between the teeth by bail 72 and also because it is biased by spring 258 against the right edge of a tooth 130 of the bail. The rocking motion of the bail causes link 82 connected thereto to rock clockwise. In rocking clockwise link 80, which is connected by pin 132 to link 82, will move to the right in FIG. 6.

It should be noted that when link 80 is originally moved to the left in FIG. 4, before it is moved to the right as aforementioned, to move it to the position of FIG. 6, tab 139 of link 80 will be removed from contact with surface 140 of link 142 to release the link. The link will then rotate clockwise about pivot pin 144 under the biasing action of spring 146 which is connected to arm 148 of the link. The rotation will continue until projection 150 on link 142 is positioned between two adjacent teeth 136 of rotatable member 138, to hold the member in position.

Then when link 80 is moved to the right from the left position of FIG. 6 to index member 138, surface 152 of a tooth of member 138 will cam projection 150 outward until the projection is in line with the next space between the teeth whereupon it will be snapped back into position by spring 146 to once again hold member 138 in position. By link 142 going from the space between two teeth to the space between the next two teeth, it thereby insures that tab 134 of link 80 will only move rotatable member 138 one tooth space at a time.

Therefore, as the counting finger shaft moves from order to order of the quotient register, and link 80 is moved to the right in FIG. 6 from the position it is in in FIG. 6, tab 134 rotates member 138 on shaft 154 tooth by tooth until projection 156 extending perpendicularly from member 138, contacts abutment 158 on disc shaped member 160, which is positioned on the same shaft 155 as member 138. With projection 156 and abutment 158 in contact, member 138 is stepped one more time so that member 160 will be rotated counterclockwise. The rotation will cause bifurcated projection 162 of member 160 to be raised to actuate the stopping mechanism as will subsequently be described.

Figure 5:
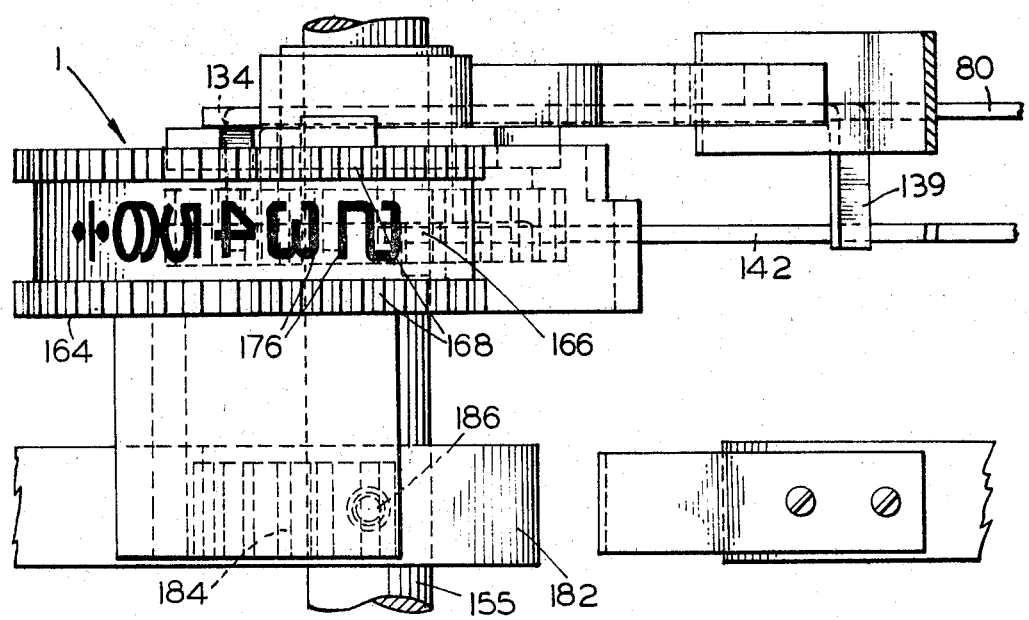
FIG. 5 is a plan view of the settable dial employed with the present invention.

Surrounding members 138 and 160 is outer dial casing 164. This casing contains an outer surface 166 bearing the numerals two to six (176) in clockwise order (FIG. 5) and a division symbol 178. On each side of the numerals there is a serrated edge 168 which is used for manually turning the casing either clockwise or counterclockwise to set it to the desired position. The numerals two through six indicate the number of shifts between orders the mechanism will pass through in division before it is terminated; while the division indicates that no premature termination is desired, and thereby the division mechanism will divide out the divisor and dividend to the full capacity of the division mechanism. When dial casing 164 is rotated clockwise to change its setting from the two setting as shown in FIGS. 2, 5 and 6, abutment 170 on the inner surface of the casing will be moved clockwise. The movement will cause radial projection 172 on member 138, which is biased by spring 174 against abutment 170, to follow the abutment and thereby cause member 138 to be rotated clockwise so that projection 172 and abutment 170 remain in contact. Spring 174 which causes the aforementioned biasing action is connected between pin 177 on member 138 and hole 179 on casing 164.

Because of the rotation of the member 138 clockwise, projection 156 and abutment 158 on member 160 are thereby further apart circumferentially than they were in the "two" setting and therefore member 138 will have to be rotated a greater distance, through a greater number of teeth, by tab 134 of link 80 before projection 156 contacts abutment 158. As aforementioned, when member 138 rotates with the projection and abutment in contact it causes the rotation of member 160 and thereby the lifting of bifurcated projection 162 of the member to actuate the stopping mechanism as will be described hereinafter.

Therefore, since a tooth of member 138 will only be moved by the movement of link 80, by rotating casing 164 clockwise more teeth 136 will have to be indexed by link 80 and therefore more orders of the division mechanism will have to be counted out by the quotient counting finger before bifurcated projection 162 is raised to cause the mechanism to terminate (as will be subsequently described).

The numbers 176 on the casing are arranged in numerical order so that when the casing is rotated clockwise to indicate a larger number this will bring that many extra teeth 136 into operative position so that many extra orders of the quotient register will have to be counted before termination. For example, if the casing is at a setting of two and it is rotated to a setting of four, two extra teeth 136 will be brought into position so that they have to be indexed before the mechanism will terminate. It will be appreciated that the reverse is, of course, also true so that counterclockwise rotation of the casing will reduce the number of teeth and thereby reduce the number of orders to be counted. Only the numbers two through six are shown in the drawings, but it will be seen that as many numbers as desired may be used depending on the number of orders of the quotient register.

The division symbol 178 which disables the termination mechanism and permits the division process to go to completion will be subsequently described.

Casing 164 also contains an arcuate extension 180 which projects from the casing and partially around circular member 182, which is a part of the frame of the machine. On the inner surface of extension 180 are six grooves 184, which correspond with the numerals two to six and the division symbol 178 on the outer surface of the casing. These grooves are engaged by a spring biased ball detent 186 (FIG. 6) which is housed within a cut-out 188 on member 182 so that as the casing is rotated to a setting, the ball detent will fit in the groove 184 which corresponds to that setting and thereby firmly position the casing in that setting.

Reverting back to the operation of the mechanism as member 138 is stepped one more tooth position in a counterclockwise direction (FIG. 6) with projection 156 in contact with abutment 158 of disc member 160, the disc member is rotated in a counterclockwise direction to cause bifurcated end 162 thereof to lift end 190 of cross link member 192 which spans the front of the machine and is interconnected into the division terminating mechanism. Cross link member 192 is a flat, elongated member pivoted approximately in the center thereof at 194 by a nut and bolt connection. The nut and bolt connection secures the link to a plate 193 which is fastened to part 195 of the frame of the machine. Link 192 has one end 190, the left end as shown in FIG. 2, engaged between the prongs of bifurcated end 162 of disc 160, as aforementioned, and the other end held by a spring 196 connected through aperture 198 therein to bias the link in a counterclockwise direction. Near the aperture where the spring 196 is connected to the link, there is another slot 200 in the link in which end 202 of link 204 is positioned, as will be subsequently described. Therefore, when disc 160 rotates counterclockwise, as just previously described, and lifts the left end of member 192, its right end will be moved downward to cause link 204 to move in a counterclockwise direction being pivoted about pivot pin 206. Pivot pin 206 connects link 204 to bail 208, which will be described hereinafter.

The movement of link 204 causes hook 210 which extends downwardly from the link adjacent its end 202, to be positioned in the path of pin 212 which extends perpendicularly from disc shaped reciprocating member 214. Member 214 is reciprocated by having two extending prongs 216 adjacent its lower surface engaged with projection 218 of member 220. The latter member 220 is secured by means of two pins 222 to rack raising and lowering member 20. So, therefore, when member 20 moves back and forth to raise and lower the racks 10, as previously described, it also causes member 214 to be rocked counterclockwise and clockwise about pivot pin 224.

Now since hook 210 of link 204 is in the path of pin 212 when disc 214 is rocked in a counterclockwise direction, the hook will engage pin 212 and pull link 204 forwardly in the direction of the arrow beneath the link in FIG. 2. The forward movement of this link causes bail 208 which is interconnected thereto by means of pin 206, as aforementioned, to be rocked in a clockwise direction about pivot point 226 so that hook extension 228 of the bail will be disengaged from hook 230 of restoring link 232.

Link 232 will then begin to move forward toward the left in FIGS. 2 and 7 under the influence of spring 234 which is connected to arm 236 of the link. The forward movement will cause hook 230 to move under hook 228 of bail 208 so that the bail is kept in the rocked position. It will also cause stub shaft 238 to rock member 240 in a counterclockwise direction, as shown by the arrow in FIG. 2, to thereby cause the division shaft 64, which is connected to member 240, to be rotated counterclockwise to its home position. Arm 62 which is attached to the end of the division shaft will also thereby be restored counterclockwise to its home position. When arm 62 is restored counterclockwise, it releases tip 58 of link 36 causing the link to be rocked clockwise under the biasing action of spring 231, connected thereto.

Then as link 232 moves forward a slot 242 in the left end thereof (FIG. 7) moves further onto a stud 244 on bail 246. Because of the engagement between the two, when bail 246 is rocked counterclockwise and then clockwise about pivot 247 by its follower end 248 riding over bump 250 on the surface of cam 252, it will carry link 232 with it, so that nose 252 of the link will engage division program slide 38 and restore it downwardly to cause it to slide into its home position (into the plane of the paper in FIG. 4).

After its forward movement is completed, link 232 is restored to the right in FIG. 7 by being connected to link 100, so that when link 100 is moved in a counterclockwise direction by its follower arm 98 following the surface of cam 96, link 232 is restored to its home position. Link 232 and link 100 are connected by pin 254 on link 232 engaging slot 256 on link 100.

When link 232 is restored, hook end 230 of the link is removed from its position underneath hook end 228 of bail 208, to permit bail 208 to rock counterclockwise to its home position under the influence of spring 217 which is connected thereto. Hook ends 230 and 228 are thus returned to their home position where they are engaged as shown in FIG. 2.

Also, in rocking counterclockwise, bail 208 will move link 204 to the right in FIG. 7. It is thereby partially restored. Its forward end 202 will be raised to completely restore it when bail 192 is restored as will be described hereinafter.

Further along the line of restoring the mechanism, when arm 62 which is connected to the left side of the division shaft is returned to its home position, as aforementioned, tab 60 thereon engages hook 68 on arm 70 of aligning bail 72 to rotate it clockwise (FIG. 4) and return it to its home position and thereby remove its saw tooth edge 74 from contact with the counting finger shaft 64. With saw tooth edge removed from engagement with the counting finger shaft, and pawl 116 being held out of engagement with cam 120 by pin 112 engaging extension 118 of the pawl, there is nothing to hold the counting finger shaft in position, so that it is now biased under the influence of spring 258 to its home position of FIG. 2. Links 82 and 80 are restored to the right to their home position as shown in FIG. 4 when aligning bail 72 is restored, since they are connected to it. When link 80 returns to its home position, the position of FIG. 4, end 251 of the link cams along bearing surface 137 to disengage its tab end 134 from teeth 136 of member 138 and move the tab to the home position of FIG. 4. Tab 139 of link 80 engages surface 140 of link 142 as link 80 is returning to its home position to pull the link in a counterclockwise direction and remove its projection 150 from teeth 136. When the projection is removed, spring 174 restores member 138 clockwise to a rest position where projection 172 contacts abutment 170 on casing 164.

The restoration of member 138 will cause its projection 156 to be removed from contact with abutment 158 of member 160 and thereby cause that member to be restored clockwise to its home position of FIG. 2. Member 160 will be restored because when abutment 158 is released from projection 156, link 192 which is connected to member 160, will return, in a clockwise direction, to its home position of FIG. 2 under the influence of spring 196 connected on the right end thereof. In moving counterclockwise, link 192 will raise link 204, so that the link is completely returned to its home position. As aforementioned, it was returned to the right when bail 208 was restored to its home position.

It is noted that the dividend and the divisor are printed after actuation of their respective keys. The printing operation is done in the same manner as the printing of the quotient and dividend, as will hereinafter be described.

All mechanisms associated with the dividing part of the division process thereby have been returned to their original position and the reading out of the quotient gears and the reading out of the remainder and the printing of both the remainder and the quotient will now take place. To accomplish this, the quotient register 92 is brought into mesh with teeth 260 of racks 10 to transfer the amount on each quotient gear to its respective rack. Simultaneously with the racks engaging the quotient gears, teeth 262 of the racks engage intermediate gears 264 each of which have two sets of teeth, one set of which 265 are in mesh with the racks and the other set of which are in mesh with type members 268. Thereby, as each rack moves to the rear a distance controlled by the position of each quotient gear, intermediate gear 264 will rotate counterclockwise an equal number of tooth spaces to thereby also raise each corresponding type member an equal number of tooth spaces. Each type member will thereby be raised so as to have one of its type faces 272 which corresponds to the amount in its corresponding quotient gear positioned in operative relation with roller platen 274. When the type members 268 are moved to the raised position the hammer firing mechanism 276 causes the type members to imprint the quotient on paper which is supplied from roll 278 to be positioned around the platen.

After the quotient is printed, the remainder is computed by bringing the flip-over register 26 into mesh with intermediate gear 32 which is in mesh with the racks through teeth 24. As the racks then move to the rear, the amount remaining in the flip-over register gears 30 is transferred to rack teeth 24 and thereby to type members 268, because of the connection between the racks and the type members, as aforementioned, through gears 264. The remainder is then printed in the same manner as the quotient.

The parts of the division mechanism related to computing and printing the remainder are then returned to complete the division process.

When it is desired to disable the terminating mechanism previously described so that the dividing operation will go to its normal completion, the dial casing 164 is turned clockwise (FIG. 4) until division symbol 178 is on top thereto. By rotating the casing in this manner, its tail 280 will be rotated so it contacts surface 282 of member 142 and surface 284 of member 80 when they are in the home position of FIG. 4. This will prevent these members from engaging teeth 136 of member 138 and thereby prevent indexing of the member to cause actuation of the terminating mechanism. The division process will then run to its normal completion and be terminated as follows: Termination will occur when a pin 286 on the lowest order racks engages a lever which contacts finger 288 of bail 208 to cause clockwise rotation of the member about pivot point 226. Hook 228 of the bail will then be disengaged from hook 230 of link 232 to cause restoration of the dividing mechanism in the same manner as previously described.

In summary, if it is desired in dividing 189 by 9 and permit the mechanism to operate through only three orders so that an answer of 21 and a remainder is achieved, the following operation would take place: The dial casing 164 is set to the number two, to indicate that it is desired that only three orders of the quotient register be counted. The dividend 189 is then entered into the pin carriage 6 by depression of the numeral keys 2. The dividend key 8 is then depressed to cause racks 10 to move to the rear and thereby enter the dividend through intermediate register 32 into the gears of flip-over register 26 and also print out the dividend by means of type member 268. The divisor 9 is now entered into the pin carriage also by means of the numeral keys. Then the division mechanism is actuated by depression of the division key 34 to cause the divisor to be entered in the racks and to be printed by means of type member 268. It also causes slide 38 which programs the dividing part of the division process to be moved to operative position. Also, depression of the division key causes link 36 to rock counterclockwise and thereby rock arm 62 and release the division shaft 64 which is connected thereto. The rocking of arm 62 causing bail 72 to rock counterclockwise so that its teeth 130 are brought into operative relation with the counting finger shaft 78. By edge 84 of the bail contacting end 86 of the shaft, the shaft is shifted to the right so that the counting finger 90 is brought into alignment with the highest order quotient gear.

The rocking of bail 72 also causes links 82 and 80 to be moved to the left in FIG. 4 so that tab 134 is brought into mesh with teeth 138 of member 130 for indexing the member, as will be subsequently described.

The racks then move forward and backward to subtract the divisor 9 in the racks from the dividend 266 in the flip-over register.

During each cycle of the racks, quotient counting finger 90 enters a unit in a quotient gear 92 of the quotient register starting with the highest order quotient gear. This continues during each cycle until the amount left in the order of the flip-over register is less than the divisor wherein an overdraft signal is received by means of member 94 to cause the register to flip to the add side and add the divisor 12 back into the dividend register during an additive corrective cycle.

During the add cycle, link 48 will go forward (to the left in FIG. 7), to cause indexing of the pin carriage to the next lower order. As it is moving forward, pin 112 thereon will release pawl 116. The pawl thereby engages cam 120 which is secured to the counting finger shaft on which counting finger 90 is positioned. The engagement of cam 122 with the spaces in pawl 116 causes the counting finger shaft to move one order to the right in FIG. 2. As the shaft moves, it causes conical member 88 which is on the other end of the counting finger shaft to cam against a side of a tooth of member 72 and thereby rock member 72 clockwise. Links 80 and 82, which are connected to member 72, will thus be moved to the right in FIG. 6. Tab 134 of link 82 which was previously brought into engagement with teeth 136 of member 138 will be moved forward to move member 138 one tooth space counterclockwise. This will continue for two tooth spaces since dial casing 174 was set at two in the example being described. After two orders of the quotient register have been counted and thereby disc 138 has been indexed one tooth space (it is noted that indexing only takes place as the counting finger moves from order to order and thereby indexing will start only with movement from the first order to the second and not with movement into the first order), projection 156 on member 138 is brought into engagement with abutment 158 on disc 160. Disc 138 will now be indexed one more tooth space so that it has been indexed a total of two spaces. During this movement, since projection 156 and abutment 158 are in contact, member 160 will be rotated counterclockwise so that its bifurcated end 162 which engages link 192 will rock the link clockwise (FIG. 2). The link in rocking will lower end 202 of link 204 because of the engagement between the two. Hook 210 on link 204 will thereby be brought into position to be engaged by pin 212 of a reciprocating member 214. Then, as the reciprocative member is rocked counterclockwise, pin 212 thereon will engage hook 210 to cause bail 208, which is connected to member 204, to be rocked clockwise so that its hook end 228 will be disengaged from hook end 230 of link 232.

Link 232 will now move forward under spring biasing. As it moves forward, pin 238 thereon will engage member 240 to cause the division shaft 64 to be rotated back to its home position. By restoring the division shaft, arm 62 on one end thereof will be returned counterclockwise to its home position to cause aligning bail 72 and links 80, 82 which are connected thereto to also be returned to their home positions. Further, the restoring of arm 62 will cause link 36 to be released so that it can restore the division key 34 to its home position.

Counting finger shaft will be returned to its leftward home position since bail 72 is no longer in engagement therewith.

Further, member 246 and link 232 are connected so that when member 246 is rocked by cam 96, nose 252 of member 232 will engage the division program slide 38 to return to its home position.

When, as aforementioned, link 80 is restored and its tab 134 is no longer in engagement with member 138, member 138 will be restored under the biasing of spring 174 to its home position. Projection 156 will thereby be released from contact with abutment 158 on disc 160, so that disc 160 and link 192 will be restored to their home positions under the biasing of spring 196.

Bail 208 will be restored counterclockwise under the influence of spring 217 when link 232 is restored rearwardly so that its hook end 230 no longer blocks hook 228 and thereby bail 208 from rotating counterclockwise. The combination of link 192 returning counterclockwise and bail 208 returning counterclockwise, will restore link 204 to its home position.

The dividing part of the division mechanism will thereby be returned to its home position and the quotient and remainder reading out and printing parts of the division process will take place. As per the example, the quotient of 21 will be read out of the quotient register and printed, and then the remainder will be read out of the flip-over register and printed. The quotient of 21 is arrived at in dividing 189 by 9 (per the example), because in the first order 9 is divided into 1 with a zero result. Then in the next order, 9 is divided into 18 twice, and then in the next order 9 is divided into the remaining 9 with a result of one. Since dividing has taken place in three orders and the counting finger has shifted twice, from the first to the second orders and from the second to the third, as per the "two" setting of the dial, the dividing operation will thereby terminate with the quotient of 021. The 21 will then be read out and printed without the zero to yield the desired result.

It is now apparent that the invention attains the purpose set forth and effectively solves the problem of having a mechanism which is responsive to the orders of the division mechanism for premature termination of the dividing part of the division function.

It will be appreciated that the mechanism has been described with reference to a division function but the mechanism is equally adapted to any of the four rules functions (addition, subtraction, multiplication and division).

While I have described the specific embodiment of my invention, I wish it to be understood that I desire to protect all changes and modifications thereto which fall within the spirit of the invention.

I claim:

1. A calculating mechanism comprising:
a register having a plurality of orders,
control means positionable to a setting which is related to a predesignated number of orders of said register,
sensing means which is actuated in response to an operation taking place which is related to an order of said register, and
four rules terminating means which is operated when said sensing means has been actuated in response to operations taking place related to a predesignated number of orders in accordance with the setting of said control means, to cause termination of a four rules calculating machine function before the normal termination thereof.

2. The mechanism of claim 1 wherein:
said sensing means includes a member which shifts from order to order of said register.

3. The mechanism of claim 2 wherein:
said calculating machine function comprises the dividing part of a division function.

4. The mechanism of claim 3 wherein:
said register comprises a quotient register of a division mechanism, and
said member of said sensing means which shifts from order to order of said register comprises a shaft on which a counting member for counting the quotient into the quotient register is positioned.

5. The mechanism of claim 4 wherein:
said control means comprises a dial which is positionable to a setting which is related to the number of orders of said quotient register which said shaft will move the counting member into position with, before said function terminating mechanism is actuated.

6. The mechanism of claim 5 wherein:
said dial is located at least partially externally of a calculating machine.

7. The mechanism of claim 6 wherein:
means is provided which disables the control means so that the division function proceeds to its normal termination.

8. The mechanism of claim 7 wherein:
said control means includes a toothed member, and
said sensing means includes a link which engages said toothed member to move it one tooth space each time said shaft moves the counting member from one order of the register to the next, and wherein when said toothed member is moved a number of teeth corresponding with the setting of said control means due to said shaft moving the counting member through the related number of orders of the quotient register, said function terminating means is actuated to terminate the dividing part of the division function.

9. The mechanism of claim 8 wherein:
said means which disables the control means comprises a member on said dial which prevents said link from engaging said toothed member.

10. The mechanism of claim 9 wherein:
said sensing means includes a bail which is rocked by said shaft as the shaft is moved from order to order of said quotient register, and
wherein said link is connected to said bail so that each time said bail is rocked the link is moved to move said toothed member one tooth space.

11. The mechanism of claim 10 wherein:
said function terminating mechanism includes means for returning the dividing part of the division mechanism to its original position.

12. The mechanism of claim 11 wherein:
a plurality of settings are provided on said dial and wherein when said dial is changed from one setting to a new setting the number of teeth of said toothed member which are in position to be engaged by said link is changed accordingly so that the number of teeth will correspond with the new setting and thereby the number of orders of the register through which the shaft will move before termination will also relate to this new setting.

13. The mechanism of claim 1 wherein means is provided so that said operation taking place is by shifts between the predesignated number of orders of said register.

14. The mechanism of claim 1 wherein means is provided so that said operation taking place takes place in a predesignated number of orders of said register.

References Cited

UNITED STATES PATENTS

| | | | |
|---|---|---|---|
| 2,467,419 | 4/1949 | Avery | 235—61 |
| 3,081,938 | 3/1963 | Walther et al. | 235—60.15 |
| 3,082,944 | 3/1963 | Gubelmann | 235—61 |
| 3,101,895 | 8/1963 | Wagemann | 235—61 X |
| 3,188,003 | 6/1965 | Gang | 235—61 X |
| 3,194,495 | 7/1965 | Gang | 235—61 X |

RICHARD B. WILKINSON, Primary Examiner

S. A. WAL, Assistant Examiner

U.S. Cl. X.R.

235—61